United States Patent Office 3,344,865
Patented Oct. 3, 1967

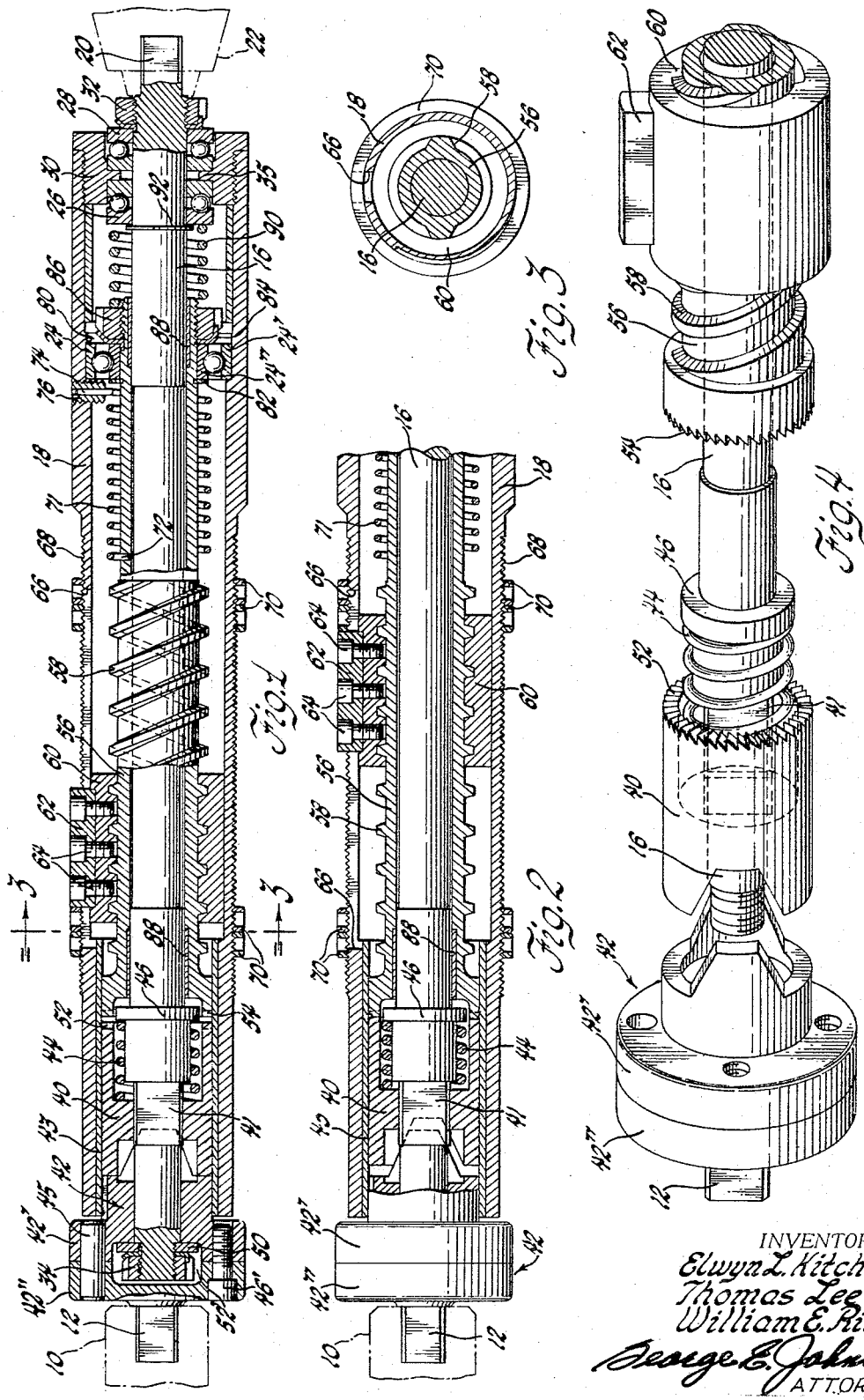

3,344,865
PREDETERMINED TORQUE PLUS TENSION
APPLYING DEVICE
Elwyn L. Kitchen, Jr., Defiance, Ohio, and Thomas Lee, Detroit, and William E. Rise, Grosse Pointe Farms, Mich., assignors to General Motors Corporation, Detroit, Mich., a corporation of Delaware
Filed Sept. 27, 1965, Ser. No. 490,474
7 Claims. (Cl. 173—12)

This invention relates to a tool or wrench device and more particularly to a device for applying a predetermined tension to a workpiece such as a bolt or nut.

Maximum strength has been realized in the tightening of nuts and bolts by first using a mechanism to apply a predetermined torque and then turning the bolt or a nut a given additional number of turns with a hand wrench to secure an ultimate tension. In following this two-step procedure the bolt tension is controlled by the number of turns rather than on the basis of torque and a power tool or device has become desirable whereby such procedure may be followed, repeated accurately and automatically.

An object of the present invention is to provide a device whereby a bolt or nut may be tightened with tension rather than torque being the controlling factor.

A feature of the present invention is a device adapted to be driven to apply a predetermined torque to a workpiece such as a bolt or nut and subsequently to impart a predetermined number of turns to the workpiece to achieve an ultimate desired tension in the latter.

This and other important features of the invention will now be described in detail in the specification and then pointed out more particularly in the appended claims.

In the drawings:

FIGURE 1 is a sectional view through a tension applying device in which the present invention is embodied, the parts being positioned in readiness for applying a predetermined torque to a bolt or nut;

FIGURE 2 is a sectional view somewhat similar to that of FIGURE 1 but with the parts positioned immediately upon the completion of the tightening operation and prior to release of the workpiece;

FIGURE 3 is a sectional view looking in the direction of the arrows 3—3 in FIGURE 1; and FIGURE 4 is an exploded and perspective view of driving parts shown in FIGURES 1 and 2.

In FIGURES 1 and 2 of the drawing, a workpiece 10 is depicted in dot and dash lines as being receptive to the squared end 12 of an adapter part attached to one end of a shaft 16. This shaft is rotatable within a fixed casing 18 and has an opposite squared end 20 adapted to be engaged by a prime mover indicated in FIGURE 1 by dot and dash lines at 22. The driver or right hand end of the shaft 16 is supported in the casing 18 by means of a movable bearing 24 and step bearings 26 and 28. The latter two bearings are retained by a suitable cap member 30 threaded into one end of the casing 18. A nut 32 at the driver end of the shaft 16 cooperates with a nut 34 at the other end of the shaft and a flange 35 on the cap member 30 to hold the shaft 16 in its axial position within the casing.

Two over-riding jaw clutch members 40 and 42 are rotatable on the driven end of the shaft 16 and within a bushing 43 and these members are of a well known type in that if an overload in torque is supplied, the member 40 will slip along a squared part 41 of the shaft by virtue of cam action between the lands on the members 40 and 42. The two clutch members are urged into engagement by means of a coil spring 44 encircling the shaft 16 and acting between an annular ridge 46 on the shaft and the member 40.

The clutch member 42 is made of two parts 42′ and 42″ which are non-rotatably held together by devices such as the pin 45 and bolt 46′. The clutch member part 42″ has the squared end 12 for engaging the workpiece 10. The nut 34 and a cooperating washer 50 are enclosed within a recess 52′ defined by the two parts 42′ and 42″.

The clutch member 40 has an annular series of ratchet teeth 52 and these are adapted to engage ratchet teeth 54 of a screw sleeve 56 which in turn is rotatable on the shaft 16. The Acme threads 58 of the screw sleeve 56 engage a nut 60 which is slidably located in the annular space between the casing 18 and the screw sleeve and this nut has a key member 62 affixed to it by means of screws 64 and it extends from the nut 60 to slide in a slot 66 formed in the casing 18 and along part of the length of the latter. The casing is threaded as at 68 to receive two sets of threaded stop rings 70. Each pair of these stop rings may be adjusted on the thread 68 of the casing and upon being tightened, each pair of rings constitutes a stop means determining the range of movement of the key member 62 along the length of the casing 18.

Surrounding one portion of the screw sleeve 56 is a coil spring 71 which has one end 72 anchored in the screw sleeve and the other end 74 anchored in a plug 76 screwed into the casing 18.

The bearing 24 has its outer race 24′ slidable within a cylindrical surface 80 of the casing and the inner race 24″ is anchored to the screw sleeve 56 by means of a spring clip 82, a locating washer 84 and a nut 86. Two spaced bushings 88 are interposed between the screw sleeve 56 and the shaft 16. A coil spring 90 encircles the shaft and acts between the nut 86 and the inner race of the bearing 26. A spring clip 92 ensures that no linear motion takes place between the shaft and the bearing 26.

In the operation of the tensioning device, the casing 18 is held still and the prime mover or driving mechanism 22 is applied to the squared end 20 of the shaft 16 while the squared end 12 at the other end of the tool is caused to engage the workpiece 10. When power is applied by the prime mover 22, the shaft 16 is driven and by means of the clutch members 40 and 42 the workpiece 10 is rotated to apply a given torque to the latter as determined by the engaging force of the spring 44 keeping the clutch members 40 and 42 in engagement. When that predetermined torque has been applied, the spring 44 will contract and the clutch member 40 will be caused to move to the right from its position as depicted in FIGURE 1 to engage the ratchet teeth 52 with the ratchet teeth 54 as shown in FIGURE 2. When this occurs, the screw sleeve 56 will rotate with the workpiece and shaft 16 causing the nut 60 to move to the right. After a predetermined number of turns the key 62 will engage a stop ring 70 causing the prime mover 22 to stall and the latter is thereupon disengaged. When the workpiece 10 is released from the squared piece 12 or vice versa the jaw clutch 40 moves away from and disengages the ratchet drive teeth and the tension spring 71 which had been wound up by the screw sleeve 56 during tightening serves to rotate the sleeve backward through the nut 60 until the latter is stopped in its initial position by the left-hand set of stop rings 70. The tensioning device is then ready to repeat its operation in tightening another workpiece 10.

From the above it may be seen that the loading of the spring 44 determines the preliminary torque to be applied and that the number of screw turns of the screw sleeve 56 as the key 62 travels from one set of stop rings 70 to the other determines the ultimate tension in the workpiece. The spring 90 is provided to allow the screw sleeve 56 to move for the engagement of the ratchet teeth 52 and 54 thus preventing possible jamming of the ratchet drive.

We claim:

1. A device for applying a predetermined tension to a workpiece comprising a casing adapted to be fixed in position during use, driving means rotatably mounted in said casing and including a drive shaft, jaw clutch members, and ratchet drive means, said drive shaft extending through the casing and having one end adapted to be attached to a prime mover, one of said jaw clutch members being slidably mounted on an intermediate portion of said shaft to be rotated thereby, one other of said jaw clutch members being at the other end of said shaft and adapted to rotate said workpiece in one direction, spring means urging said one jaw clutch member into engagement with said other jaw clutch member, a screw sleeve rotatable on and coaxial with said drive shaft, said ratchet drive means comprising engageable teeth on said one jaw clutch member and on said screw sleeve for driving the latter in said one direction, second spring means resiliently connecting said casing and screw sleeve and urging the latter to rotate in the opposite direction, third spring means urging said screw sleeve toward said jaw clutch members to effect engagement of said ratchet drive means, a nut engaging said screw sleeve for movement along the latter, means retaining said casing and nut against relative rotation, and stop means limiting the range of movement of said nut with respect to said casing.

2. A device for applying tension to a workpiece such as a bolt, said device comprising a fixed casing, driving means rotatably mounted within and extending through said casing, said driving means being coaxial elements including a drive shaft, two jaw clutch members and ratchet drive means, said drive shaft having one end adapted to be attached to a prime mover, one of said jaw clutch members being slidably mounted on an intermediate portion of said shaft for rotation thereby, one other of said jaw clutch members being slidable on the other end of said shaft and adapted to rotate said workpiece, spring means urging said one jaw clutch member into engagement with said other jaw clutch member, a screw sleeve rotatable on and coaxial with said drive shaft, said ratchet means comprising cooperable parts of said one jaw clutch member and said screw sleeve, second spring means resiliently connecting said casing and screw sleeve and urging the latter to rotate, third spring means urging said screw sleeve toward said jaw clutch members to effect engagement of said ratchet means, a nut engaging said screw sleeve for movement along the length of the latter, means retaining said nut against rotation relative to said casing, and stop means limiting linear movement of said nut.

3. A device as set forth in claim 2, said spring means having a loading whereby said jaw clutch members are adapted to disengage when a predetermined torque is applied to said workpiece.

4. A device as set forth in claim 2, said second spring means being adapted to rotate said screw sleeve in a reverse direction upon disengagement of said ratchet means.

5. A device as set forth in claim 2, step bearing means being interposed between said third spring means and said one end of said drive shaft.

6. A device as set forth in claim 2, said stop means being adjustable with relation to said casing whereby the extent of linear movement of said nut and the number of driving turns imparted to said workpiece after said jaw clutch members are disengaged may be controlled.

7. A device for applying a predetermined tension to a workpiece, said device comprising a fixed casing, driving means extending through said casing and including a drive shaft, over-riding clutch members and ratchet drive means, said drive shaft having one end adapted to be rotated in one direction by a prime mover, one of said clutch members being slidably mounted on an intermediate portion of said shaft and non-rotatable with respect thereto, spring means urging said clutch members into engagement, a screw sleeve rotatable on said drive shaft, said ratchet drive means comprising registrable teeth on said one clutch member and said screw sleeve for driving the latter in said one direction, second spring means connecting said casing and screw sleeve and urging said sleeve to rotate in a direction opposite to said one direction, third spring means linearly urging said screw sleeve to effect engagement of said ratchet drive means, a nut on said screw sleeve, means locking said casing and nut against relative rotation, and adjustable stop means on said casing and adapted to limit the range of linear movement of said nut with relation to said casing.

References Cited

UNITED STATES PATENTS 2,990,812    7/1961    Gattiker et al. _____ 173—163
3,011,479    12/1961    Spyridakis et al. _____ 173—163

FRED C. MATTERN, Jr., *Primary Examiner.*

L. P. KESSLER, *Assistant Examiner.*